United States Patent [19]

Ikeuchi et al.

[11] 4,406,169
[45] Sep. 27, 1983

[54] METHOD OF AND SYSTEM FOR MONITORING BEARING CONDITIONS

[75] Inventors: Kazuo Ikeuchi; Tsuguaki Koga; Tomoaki Inoue; Katsumi Oyabu, all of Hitachi, Japan

[73] Assignee: Hitachi, Ltd., Tokyo, Japan

[21] Appl. No.: 258,593

[22] Filed: Apr. 29, 1981

[30] Foreign Application Priority Data

May 2, 1980 [JP] Japan .................. 55-57866

[51] Int. Cl.³ .................................................. G01L 5/00
[52] U.S. Cl. ........................... 73/862.54; 73/862.58; 340/682
[58] Field of Search ........... 73/862.49, 862.54, 862.58; 340/682

[56] References Cited

U.S. PATENT DOCUMENTS 3,365,711  1/1968  Levesque .................. 340/682 X
3,582,928  6/1971  Gaertner .................. 340/682 X

FOREIGN PATENT DOCUMENTS 54-128384  10/1979  Japan .................. 73/862.58

Primary Examiner—Charles A. Ruehl
Attorney, Agent, or Firm—Antonelli, Terry & Wands

[57] ABSTRACT

A method of and a system for monitoring the conditions of a journal bearing having a bearing surface for supporting a rotatable shaft through an oil film. Detectors detect the speed of rotation of the shaft and the pressure of the oil film. The load on the journal bearing is calculated based on the rotational speed of the shaft and the pressure of the oil film.

26 Claims, 16 Drawing Figures

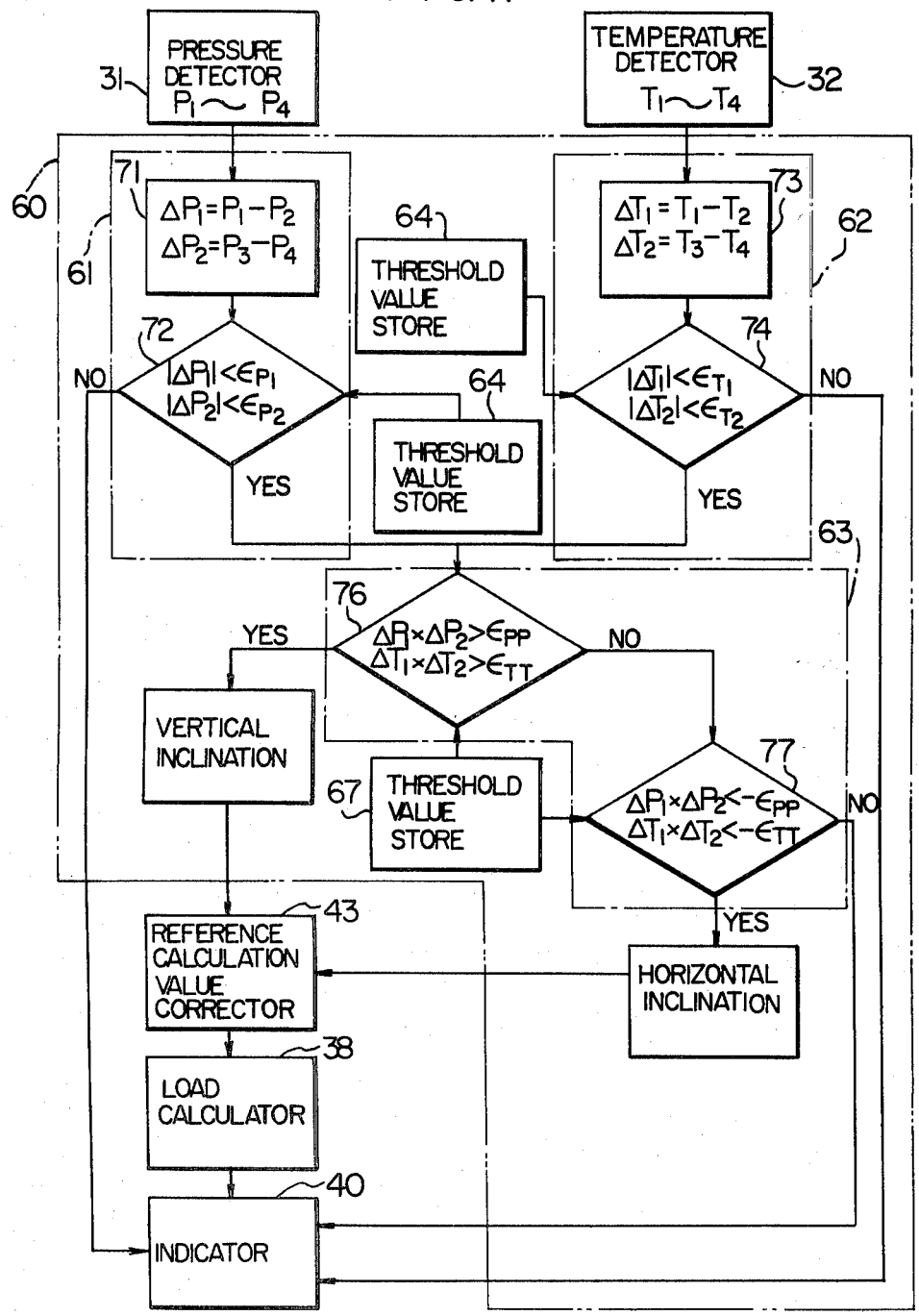

METHOD OF AND SYSTEM FOR MONITORING BEARING CONDITIONS

BACKGROUND OF THE INVENTION

1. Field of the Invention

This invention relates to a method of and a system for monitoring during operation the conditions of a journal bearing having a bearing surface for supporting a rotary shaft through an oil film.

2. Description of the Prior Art

A journal bearing is used for supporting a rotor of a rotary machine, such as a steam turbine, a generator, etc. For the journal bearing used for this purpose, a suitable type of journal bearings are selected that have a diameter and width considered optimum in view of the weight of the rotor, the torque transmitted by the rotor, and other factors.

A rotor of a large type rotary machine weight over 200 tons and is usually rotated at a high speed in the range between 1500 and 3600 rpm, so that the bearing for supporting the shaft of the rotor are required to be built solidly and continue to operate in normal conditions during operation. The shaft and the bearing surface are displaced relative to one another due to various factors. As a result, a load applied to the bearing might inordinately increase or decrease to cause the thickness of the oil films to be abnormally decreased or increased, respectively. An increase in the thickness of an oil film of a bearing might subject the rotor to abnormal vibration such as steam whirl, thereby developing a rubbing between the rotor and a stator. A decrease in the thickness of an oil film of a bearing might render the oil film discontinuous and raise the temperature of the surface layer of the bearing, thereby causing seizure to occur on the surface layer of the bearing.

Relative displacements of a shaft and a bearing surface would be mainly caused by the fact that thermal deformation of a support for a bearing under the influences of ambient temperature causes the bearing to be vertically displaced or causes the bearing to be inclined with respect to the bearing surface, the fact that a variation in the internal pressure of a turbine casing causes a bearing support to be vertically displaced or inclined with respect to the shaft when the rotary machine is a turbine, and the fact that a plurality of portions of amount supporting the rotary machine are non-uniformly depressed with time.

In view of the foregoing, it will be understood that it is possible to accurately grasp the conditions of a bearing by determining the load on the bearing during operation.

Heretofore, proposals have been made to continuously monitor and measure the temperature of oil fed to a bearing and discharged therefrom, the pressure of the oil fed to the bearing, and the temperature of the surface layer of the bearing, to determine the conditions of the bearing. The temperature of the oil fed to and discharged from a bearing is insensitive to changes in the load on the bearing, so that it is very difficult to judge the bearing load merely based on the temperature of the oil. The pressure of the oil fed to the bearing has nothing to do with the load on the bearing. It is impossible to obtain the bearing load merely based on the temperature of the surface layer of the bearing.

U.S. Pat. No. 4,118,933 to Coleman et al. discloses an arrangement in which strain gauges are mounted on a bearing support structure for measuring the bearing load. This arrangement, however, is not intended to obtain the bearing load based on the pressure of an oil film between the bearing surface and the shaft.

SUMMARY OF THE INVENTION

Accordingly, this invention has as its object the provision of a method of and a system for monitoring a bearing continuously during operation to accurately grasp the conditions of the bearing by obtaining the bearing load based on the pressure of an oil film between the bearing surface and the shaft.

According to the invention, there is provided a method of monitoring the conditions of a journal bearing having a bearing surface supporting a rotatable shaft through an oil film, comprising the steps of: measuring the speed of rotation of the shaft; measuring the pressure of the oil film; and calculating the load on the journal bearing based on the measurements of the speed of rotation of the shaft and the pressure of the oil film.

According to the invention, there is also provided a system for monitoring the conditions of a journal bearing having a bearing surface supporting a rotatable shaft through an oil film, comprising rotational speed detecting means for detecting the speed of rotation of the shaft to produce a signal indicative of the detected rotational speed, pressure detecting means for detecting the pressure of the oil film to produce a signal indicative of the detected pressure of the oil film, and a bearing load calculating unit for calculating the load on the journal bearing based on the signals from the rotational speed detecting means and the pressure detecting means.

BRIEF DESCRIPTION OF THE DRAWINGS

FIG. 11 is a flow chart of the logic circuitry of the comparing and judging unit of the monitoring system shown in FIG. 5;

DETAILED DESCRIPTION OF THE PREFERRED EMBODIMENT

Figure 1:
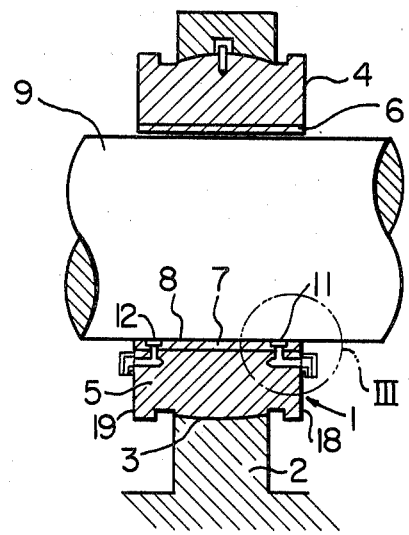
FIG. 1 is substantially central longitudinal vertical sectional view of a bearing assembly.

FIG. 1 shows a journal bearing assembly to which the invention is applicable, comprising a bearing 1 and a bearing support 2 supporting the bearing 1 through an outer partially spherical surface 3 thereof. The bearing 1 includes a bearing body comprised of an upper half-portion 4 and a lower half-portion 5 having inner surfaces lined respectively with bearing layers 5 and 7 in the form of a half cylinder formed as of Babbitt metal. The bearing layers 6 and 7 have their surfaces cooperating with each other to define a cylindrical bearing surface 8 supporting a shaft 9 of a rotor of a rotary machine for rotation through an oil film.

Figure 2:
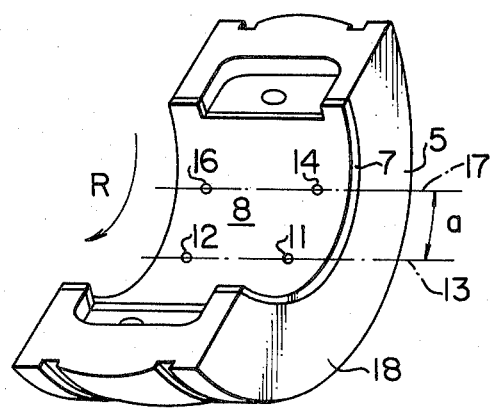
FIG. 2 is a schematic perspective view of the lower half-portion of a bearing body.

Referring to FIG. 2, the lower half-portion 5 of the bearing body is formed with a first pressure detecting port 11 and a second pressure detecting port 12 located in splaced relation on a first line 13 extending parallel to the axis of the shaft 9 and along the bottom of the bearing surface 8, and a third pressure detecting port 14 and a fourth pressure detecting port 16 located in spaced relation on a second line 17 extending parallel to the first line 13 and spaced apart therefrom a predetermined distance a circumferentially of the bearing surface 8 in a direction opposite to the direction of rotation of the shaft 9 indicated by an arrow R. The first and third pressure detecting ports 11 and 14 are spaced from one axial end surface 18 of the lower half-portion 5 a distance which is equal to the distance between the second and fourth pressure detecting ports 12 and 16 and the other axial end surface 19 of the lower half-portion 5.

Figure 3:
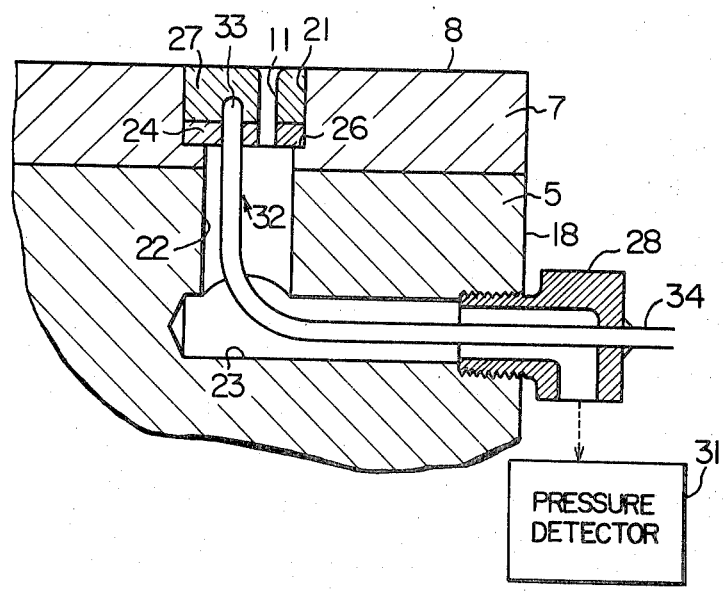
FIG. 3 is a view, on an enlarged scale, of the portion III enclosed by a phantom circle.

Referring to FIG. 3 showing on an enlarged scale a portion III shown in FIG. 1, the bearing layer 7 is formed with a bore 21 communicating with one axial end surface 18 of the lower half-portion 5 via a radial bore 22 formed in the bearing layer 7 and the lower half-portion 5 and having a diameter smaller than that of the bore 12 and an axial bore 23 formed in the lower half-portion 5 and communicating with the radial bore 22. A disc 24 is fitted in the bore 21 and located on a shoulder 26 between the radical bore 22 and the bore 21 to substantially close the former. The bore 21 and the disc 24 cooperate with each other to define a space which is filled with a filler 27 of the same material as the bearing layer 7. The first pressure detecting port 11 extends through the filler 27 and disc 24, to maintain the bearing surface 8 in communication with the radical bore 22. An elbow 28 is threadably fitted in fluid-tight relation in an end of the axial bore 23 opening at one axial end surface 18 of the lower half-portion 5 and connected to a pressure detector 31, to allow the bearing surface 8 to communicate with the pressure detector 31 via the pressure detecting port 11, radial bore 22, axial bore 23 and elbow 28. A temperature detector 32 includes a probe 33 inserted in a bore formed in the disc 24 and a blind hole formed in the filler 27 to be disposed adjacent the pressure detecting port 11. The probe 33 is connected to leads 34 extending through the bores 22 and 23 and through the elbow 28.

The second to the fourth pressure detecting ports 12, 14 and 16 are of the same construction as the first pressure detecting port 11, and each has the temperature detector 32 disposed adjacent thereto.

Figure 4:
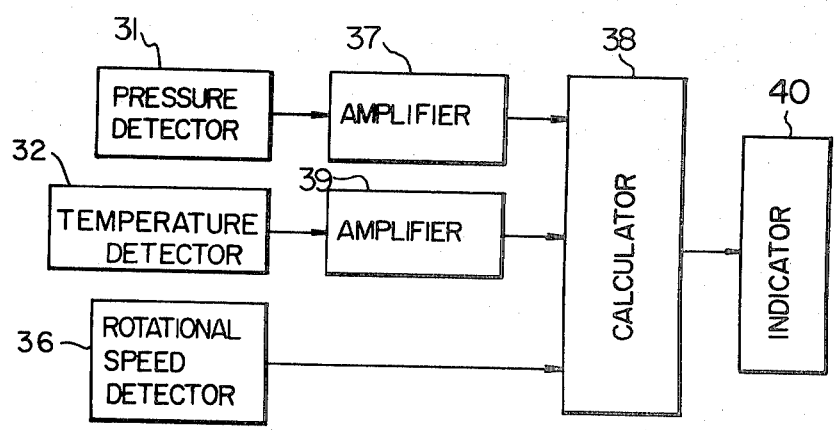
FIG. 4 is a block diagram in explanation of the basic concept on which the invention is based.

FIG. 4 is a block diagram showing the basic concept of the monitoring system according to the invention.

The monitoring system comprises, in addition to the pressure detector 31 and the temperature detector 32 described hereinabove by referring to FIG. 3 respectively for detecting the pressure of an oil film between the shaft 9 and the bearing surface 8 and the temperature of a portion of the bearing layer 7 adjacent the bearing surface 8 or the temperature of the bearing surface 8, a rotational speed detector 36 for detecting the speed of rotation of the shaft 9. The pressure detector 31 issues a pressure signal amplified by an amplifier 37 and inputted to a load calculator 38. The temperature detector 32 issues a temperature signal amplified by an amplifier 39 and inputted to the load calculator 38. The rotational speed detector 36 issues a rotational speed signal directly inputted to the load calculator 38. The load calculator 38 calculates a load on the bearing 1 as subsequently to be described based on the signals inputted thereto as aforesaid, and supplies the results of calculation to an indicating and warning unit 40.

Figure 5:
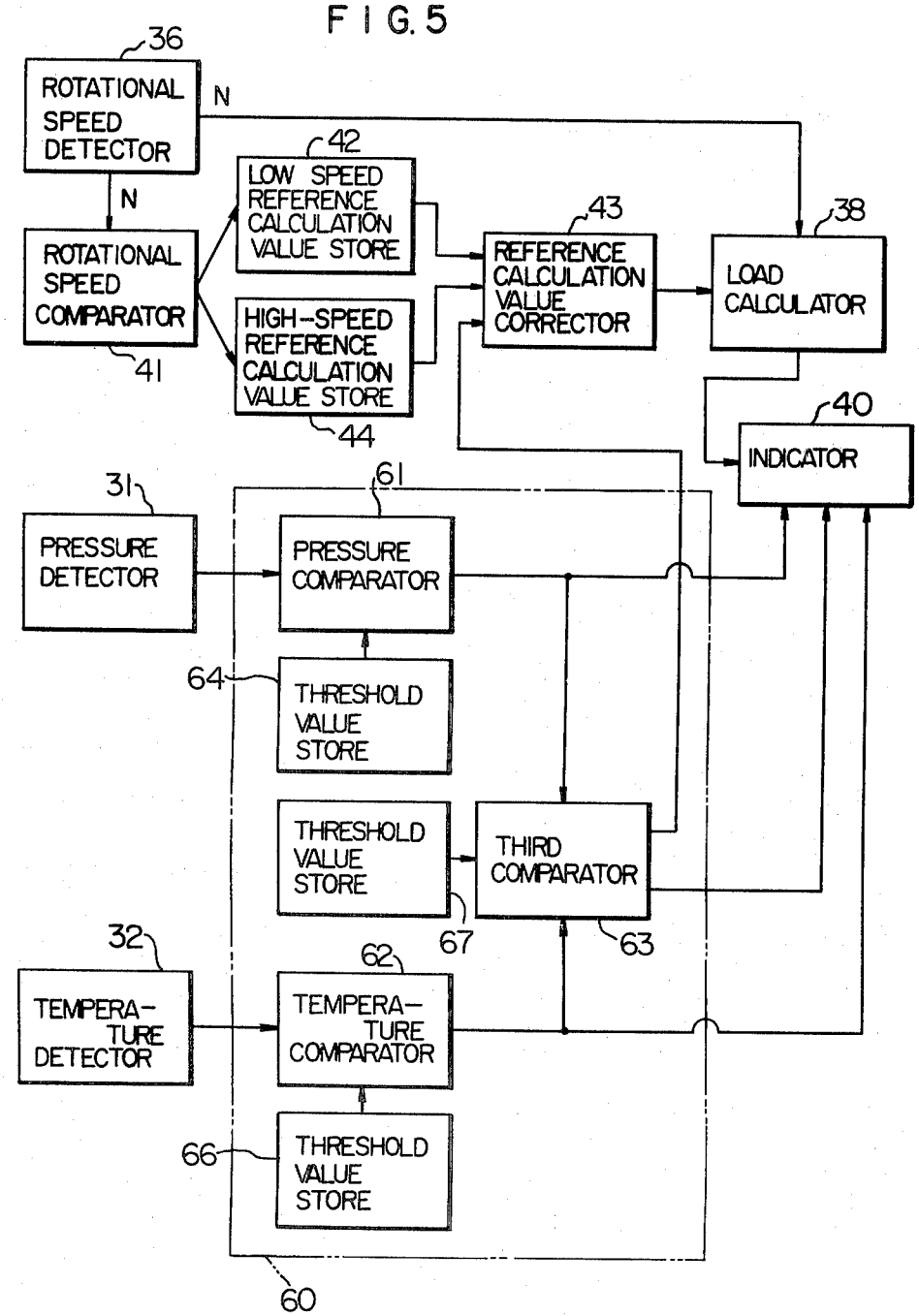
FIG. 5 is a block diagram showing the monitoring system according to the invention in its entirety.

FIG. 5 shows in a block diagram the monitoring system according to the invention in concrete construction. As described with reference to FIG. 4, the monitoring system comprises the pressure detector 31 for detecting the pressure of the oil film, the temperature detector 32 for detecting the temperature of the bearing layer 7 or the temperature of the bearing surface 8, and the rotational speed detector 36 for detecting the speed of rotation of the shaft 9. In calculating the bearing load, the value obtained for the load will vary greatly depending on whether the shaft 9 is rotating at high speed or at low speed. Thus the rotational speed signal issued by the rotational speed detector 36 is inputted to a rotational speed comparator 41 which compares the rotational speed signal with a reference value and produces a high speed signal when the shaft 9 is rotating at high speed and produces a low speed signal when it is rotating at low speed. The low speed signal is transmitted to a low speed reference calculation value store 42 which supplies to a reference calculation value corrector 43 a reference calculation value signal commensurate with the low speed signal. Likewise, the high speed signal is transmitted to a high speed reference calculation value store 44 which supplies to the corrector 43 a reference calculation value signal commensurate with the high speed signal.

Figure 6:
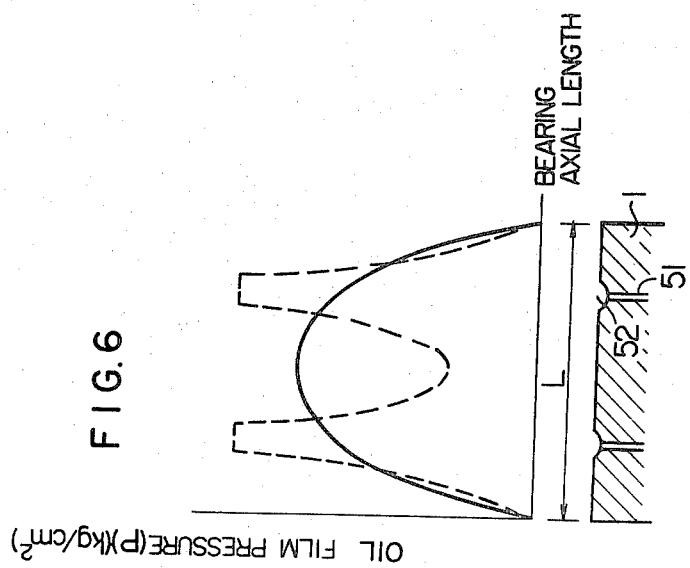
FIG. 6 is a diagrammatic showing of the distribution of the oil film pressure at the bottom of a bearing surface.

FIG. 6 shows a typical oil pressure distribution at the bottom of the bearing surface 8, at high speed rotation as well as low speed rotation. The bearing shown in FIG. 6 is a type having jacking ports 51 and jacking pockets 52. In the diagram of FIG. 6, the abscissa represents the axial length or width L of the bearing 1, and the ordinate indicates the oil film pressure P, and a solid line represents an oil film pressure obtained at high speed rotation and a dotted line indicates an oil film pressure obtained when the rotor load is supported by a jacking pressure or when the rotational speed is very low. As can be seen clearly in FIG. 6, the same reference calculation value could not be used in calculating a bearing load based on the pressure detected in a specific position on the bearing surface. The reference calculation value corrector 43 corrects the reference calculation value in accordance with values of the oil film pressure and the bearing layer temperature measured by the pressure detector 31 and the temperature detector 32 respectively, so that the reference calculation value will conform to the actual condition of the bearing 1. The signal corrected by the corrector 43 is inputted to the load calculator 38 which supplies the results of calculation to the indicating and warning unit 40.

Figure 7:
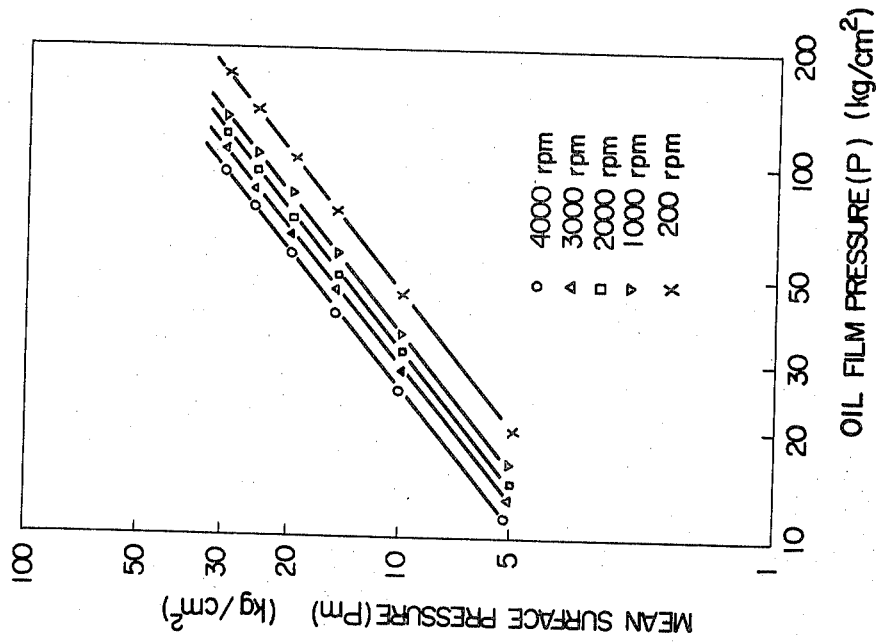
FIG. 7 is a diagram showing the relation between the oil film pressure and the mean surface pressure obtained by experiments.

The method of calculating a load on the bearing 1 and the correction or calibration of the reference calculation value thereof will now be described. FIG. 7 shows the relation between the oil film pressure P and the mean bearing surface pressure Pm obtained by experiments conducted on a bearing of a diameter D of 254 mm and an axial length or width L of 152 mm. In FIG. 7, the following relation holds:

$$Pm = K \cdot P^{0.84} \tag{1}$$

where K is the constant.

Figure 8:
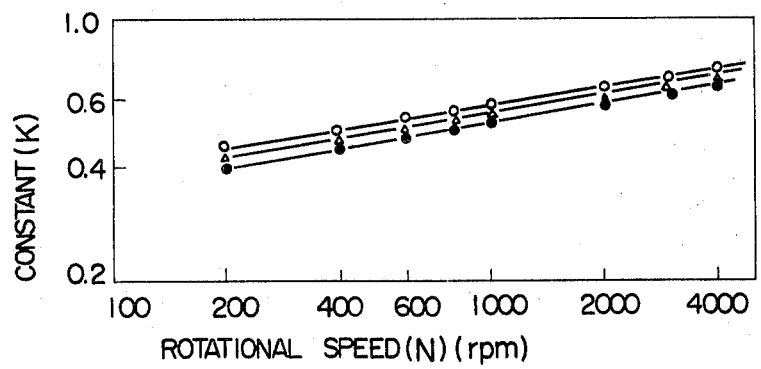
FIG. 8 is a diagrammatic showing of the relation between the number of revolutions and the constant obtained by experiments.

FIG. 8 shows the relation between the rotational speed N of the shaft and the value of the constant K as determined by experiments. In FIG. 8, it will be seen that the relation $K \infty N^{0.15}$ holds. Thus the mean surface pressure Pm can be expressed as follows:

$$Pm = K' \cdot N^{0.15} \cdot P^{0.84} \tag{2}$$

where K' is the constant.

It has been ascertained that the relation between L/D and Pm satisfies $Pm \infty (L/D)^{0.25}$. Thus the mean surface pressure Pm can be expressed as follows:

$$Pm = K'' \cdot N^{0.15} \cdot (L/D)^{0.22} \cdot P^{0.84} \tag{3}$$

where K'' is the constant.

In actual practice, the oil film pressure is measured in two positions axially spaced from each other. Thus the mean surface pressure Pm can be expressed by the following equation:

$$Pm = Ko \cdot \left( \sum_{n=1}^{2} Kn \cdot Pn^{Cn} \right) \cdot (L/D)^d \cdot N^e \tag{4}$$

The Ko, Kn, Cn, d and e in equation (4) are reference values each of which is specific for each bearing, and can be obtained as shown in equations (1)–(3). As described by referring to FIG. 6, each of these reference values will vary depending on whether the shaft is rotating at high speed or at low speed.

Figure 9:
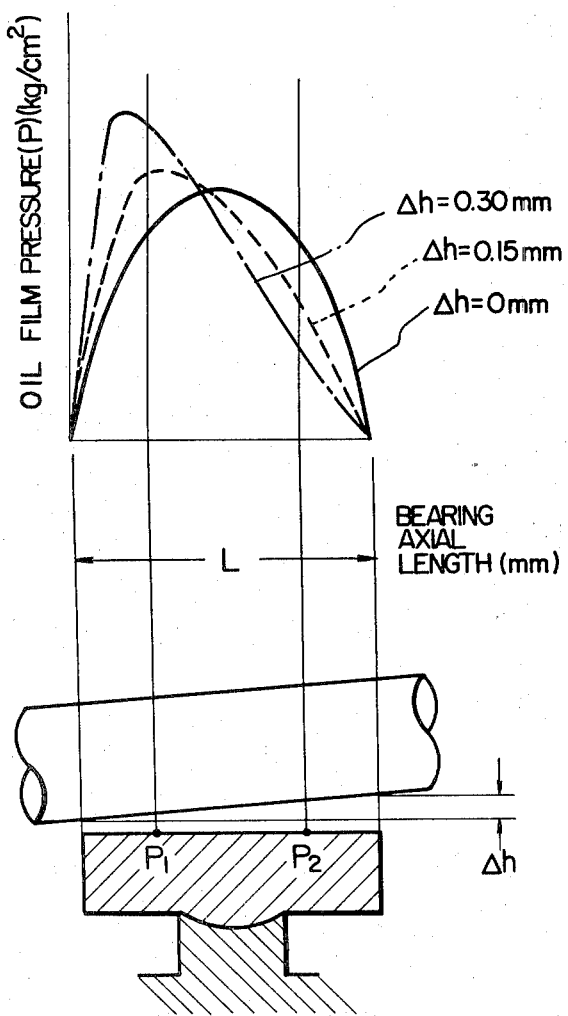
FIG. 9 is a diagram obtained by experiments showing the relation between a change in the relative inclination between the shaft and the bearing surface and a change in oil film pressure.

FIG. 9 shows the axial oil film pressure distribution at the bottom of the bearing surface measured at the time when the bearing and the shaft are inclined relative to each other. In FIG. 9, $\Delta h$ represents the amount of inclination of the bearing through the entire axial length L of the bearing, and $\Delta h = 0$ indicates the oil film pressure distribution obtained in an ideal condition. The reference values Ko, Kn, etc., referred to hereinabove are those for the condition in which the requirement $\Delta h = 0$ is met. When the $\Delta h$ is varied to 0.15 and to 0.30 mm, the oil film pressure undergoes a great fluctuation as shown in FIG. 9. Thus the mean surface pressure of the bearing can be obtained by correcting the aforesaid reference values in accordance with the change in the oil film pressure distribution in such a manner that the requirement $\Delta h = 0$ is met. More specifically, in actual practice, it has been found experimentarily that when the pressure detecting port 11 for detecting an oil film pressure P2 and the pressure detecting port 12 for detecting an oil film pressure P1 are disposed in positions spaced from the axial end surfaces 18 and 19 respectively by a distance corresponding to $\frac{1}{4}$ the axial length L of the bearing 1, the arithmetic mean value $[P = \frac{1}{2}(P1 + P2)]$ of P1 and P2 coincides with $(P1)(=P2)$ in an ideal condition of $\Delta h = 0$. Thus the function of the reference calculation value corrector 43 is to correct reference values K1, K2, C1 and C2 applied to P1 and P2 in equation (4). The bearing load W can be obtained as follows from the mean surface pressure Pm:

$$W = Pm \cdot L \cdot D \tag{5}$$

Figure 10A:
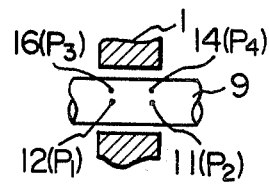
FIGS. 10a–10d are schematic views showing the direction of relative inclination between the shaft and the bearing surface.
Figure 10C:
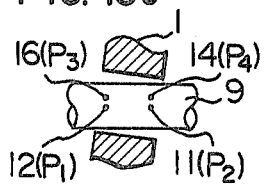
Figure 10B:
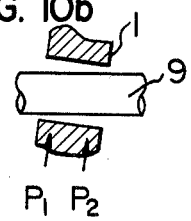
Figure 10D:
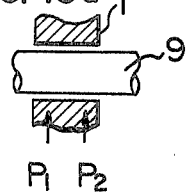

Handling of the oil film pressure and the bearing surface temperature and judging of the presence of abnormal conditions will now be described. FIGS. 10a–10d show the direction of inclination of the bearing 1 and shaft 9 relative to each other. FIGS. 10a and 10c show the relative positions of the shaft and bearing as viewed from the top of the bearing, and FIGS. 10b and 10d show the relative positions of the shaft and bearing as viewed from the side of the bearing. FIGS. 10a and 10b show the relative inclination between the shaft and the bearing, and FIGS. 10c and 10d show the relative horizontal inclination therebetween.

Referring to FIG. 5 again, pressure signals $P_1 \sim P_4$ from the pressure detectors 31 connected to the first to the fourth pressure detecting ports 11, 12, 14 and 16 respectively and temperature signals $T_1 \sim T_4$ from the temperature detectors 32 respectively are inputted to a comparing and judging unit 60 comprising a pressure comparator 61, a temperature comparator 62 and a third comparator 63. The pressure comparator 61 compares the pressure signals $P_1 \sim P_4$ with predetermined threshold values from a threshold value store 64 and supplies the pressure signals to the indicating and warning unit 40 when they are abnormal and supplies them to the third comparator 63 when they are normal. Likewise, the temperature comparator 62 compares the temperature signals $T_1 \sim T_4$ with predetermined threshold values from a threshold value store 66 and supplies the temperature signals to the indicating and warning unit 40 when they are abnormal and supplies them to the third comparator 63 when they are normal. The third comparator 63 compares the signals from the pressure comparator 61 and the temperature comparator 62 with predetermined threshold values from a threshold value store 67 and supplies the signals to the indicating and warning unit 40 when they are abnormal and to the reference calculation value corrector 43 when they are normal.

FIG. 11 is a flow chart of the logic circuitry of the comparing and judging unit 60 of the monitoring system shown in FIG. 5. As shown, the pressure comparator 61 comprises a logic circuit 71 calculating the pressure differentials $\Delta P1 = P1 - P2$ and $\Delta P2 = P3 - P4$ based on the pressure signals $P_1 \sim P_4$ from the pressure detectors 31, and a logic circuit 72 comparing the pressure differentials $\Delta P1$ and $\Delta P2$ with threshold values $\epsilon_{P1}$ and $\epsilon_{P2}$ respectively from the threshold value store 64 and judging whether the amount of relative inclination between the shaft 9 and bearing 1 is abnormal or normal. Likewise, the temperature comparator 62 comprises a logic circuit 73 calculating temperature differentials $\Delta T1 = T1 - T2$ and $\Delta T2 = T3 - T4$ based on the temperature signals $T_1 \sim T_4$ from the temperature detectors 32, and a logic circuit 74 comparing the temperature differentials $\Delta T_1$ and $\Delta T_2$ with threshold values $\epsilon_{T1}$ and $\epsilon_{T2}$ respectively from the threshold value store 66 and judging whether the amount of relative inclination between the shaft 9 and bearing 1 is abnormal or normal. Typically, values in the range between 10 and 70 kg/cm² are selected for the threshold values $\epsilon_{P1}$ and $\epsilon_{P2}$ and values in the range between 10° and 40° C. are selected for the threshold values $\epsilon_{T1}$ and $\epsilon_{T2}$.

The third comparator 63 comprises a first logic circuit 76 and a second logic circuit 77 for judging the direction of relative inclination between the shaft 9 and bearing 1 based on the product of ΔP1 and ΔP2 and the product of ΔT1 and ΔT2. More specifically, the first logic circuit 76 compares the product of ΔP1 and ΔP2 and the product of ΔT1 and ΔT2 with threshold values $\epsilon_{PP}$ and $\epsilon_{TT}$ from the threshold value store 67 respectively and judges that the shaft 9 and bearing 1 are inclined in a vertical direction relative to each other when the relations $\Delta P1 \cdot \Delta P2 > \epsilon_{PP}$ and $\Delta T1 \cdot \Delta T2 > \epsilon_{TT}$ are satisfied. In this case, an output signal of the first logic circuit 76 is supplied to the reference calculation value corrector 43 where the signal is used to correct the reference values Ko, Kn, Cn, d and e in the following equation necessary for calculating the mean bearing surface pressure Pm:

$$Pm = Ko \left( \sum_{n=1}^{4} Kn \cdot P_n^{Cn} \right) \cdot (L/D)^d \cdot N^e.$$

When the relations $\Delta P1 \cdot \Delta P2 > \epsilon_{PP}$ and $\Delta T1 \cdot \Delta T2 > \epsilon_{TT}$ are not satisfied in the first logic circuit 76, the first logic circuit 76 transmits an output signal to the second logic circuit 77 where the product ΔP1 and ΔP2 and the product of ΔT1 and ΔT2 are compared with threshold values $-\epsilon_{PP}$ and $-\epsilon_{TT}$ respectively from the threshold store 67 and judges that the shaft 9 and bearing 1 are inclined in a horizontal direction relative to each other when the relations $\Delta P1 \cdot \Delta P2 > -\epsilon_{PP}$ and $\Delta T1 \cdot \Delta T2 > -\epsilon_{TT}$ are satisfied. In this case, an output signal of the second logic circuit 77 is transmitted to the reference calculation value corrector 43. When the aforesaid relations are not satisfied in the second logic circuit 77, the output signal of the second logic circuit 77 is supplied to the indicating and warning unit 40 which indicates that an abnormality is sensed in the measuring system.

The corrector 43 supplies an output to the bearing load calculator 38 which calculates the mean surface pressure Pm based on the oil film pressures P1 and P2 by the formula (4) and which calculates the bearing load W based on the mean surface pressure Pm by the formula (5).

Figure 12:
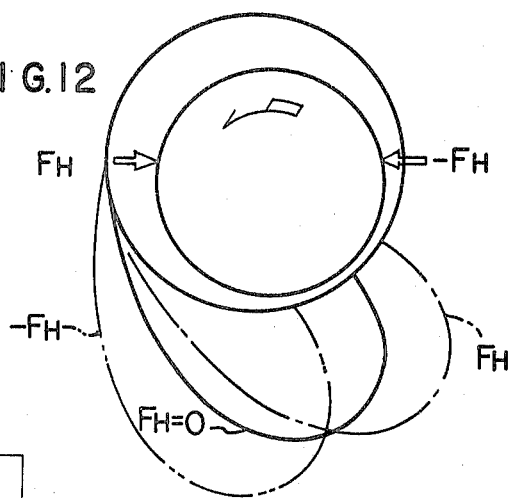
FIG. 12 shows the distribution of the oil film pressure determined when a horizontally directed force is exerted on the bearing.

In a rotary machine in which the shaft is supported by a plurality of bearings, as in a steam turbine, for example, the bearings would have gaps between the bearing surface and the shaft, which gaps are different from each other in the individual bearings. In this case, the shaft would be subjected to not only a vertical force, but also a horizontal force in each of the bearings. Furthermore, a miscoupling would also cause a horizontally directed force to be exerted on the shaft. FIG. 12 shows the oil film pressure distribution obtained when the shaft is under the influences of a horizontally directed force. When a horizontally directed force $F_H$ or $-F_H$ is exerted on the shaft, the pressure of the oil film would show a variation from its level in a normal condition in which $F_H=0$, making it impossible to calculate mean surface pressure by equation (4) and to calculate bearing load by equation (5). To cope with this situation, a horizontally directed force is determined from the oil film pressure ratios $\overline{P}_1=P_1/P_3$ and $\overline{P}_2=P_2/P_4$ in each operating condition based on the pressure signals $P_1 \sim P_4$ from the pressure sensors 31. The horizontally directed force can be obtained by the following equation:

$$F_H = Ko' \cdot [\log (\overline{P}_1 + \overline{P}_2)] \cdot (L/D)^g \cdot N^h \quad (6)$$

Figure 13:
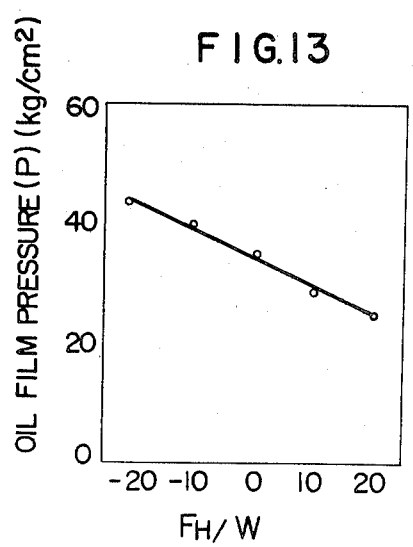
FIG. 13 is a diagrammatic showing of the relation between the horizontally directed force acting on the bearing and the oil film pressure at the bottom of the bearing surface obtained by experiments.

FIG. 13 shows the relation between the horizontally directed force $F_H$ and the oil film pressure P at the bottom of the bearing surface when the shaft rotates at 3000 rpm by bearings each having a diameter D of 254 mm and the ratio of the axial length L of the bearing to the diameter D, L/D=0.9. In the figure, it will be seen that the horizontally directed force $F_H$ is substantially in proportional relation to the oil film pressure P. Based on this proportional relation, the oil film pressure obtained when the horizontally directed force acts on the shaft is corrected to obtain an oil film pressure for the normal operating condition, and the bearing load W is calculated by equations (4) and (5).

What we claim is:

1. A method of monitoring the conditions of a journal bearing having a bearing surface supporting a rotatable shaft through an oil film, comprising the steps of:
   measuring the speed of rotation of the shaft;
   measuring the pressure of the oil film by measuring the pressure of the oil film in a plurality of positions on the bearing surface;
   calculated the load on the journal bearing based on the measured values of the rotational speed of the shaft and the pressure of the oil film; and
   judging the condition of relative inclination between the shaft and the bearing surface based on the measured values of the pressure of the oil film, said bearing load calculating step calculating the load on said journal bearing based on the condition of relative inclination between the shaft and the bearing surface and the measured value of the rotational speed of the shaft.

2. A method defined in claim 1, wherein the condition of relative inclination between the shaft and the bearing surface includes the amount of relative inclination between the shaft and the bearing surface.

3. A method defined in claim 1, further comprising the step of measuring the temperature of the bearing surface, and wherein said bearing load calculating step calculates the load on said journal bearing based on the measured values of the rotational speed of the shaft, the pressure of the oil film and the temperature of the bearing surface.

4. A method defined in claim 1 or 2, further comprising the step of measuring the temperature of the bearing surface in a plurality of positions, and wherein said judging step judges the condition of relative inclination between the shaft and the bearing surface based on the measured values of the pressure of the oil film and the temperature of the bearing surface.

5. A method defined in claim 4, wherein the condition of relative inclination between the shaft and the bearing includes the direction of relative inclination between the shaft and the bearing surface.

6. A method defined in any one of claims 1-2, wherein said pressure measuring step measures the pressure of the oil film in at least two positions spaced from and aligned with each other axially of the bearing surface, said bearing load circulating step calculating the load on said journal bearing based on the mean value of the measured values of the pressure of the oil film and the measured values of the rotational speed of the shaft.

7. A method defined in claim 5, wherein said pressure measuring step measures the pressure of the oil film in first and second spaced positions of the bearing surface on a first axial line parallel to the axis of the bearing and in third and fourth spaced positions of the bearing surface on a second axial line parallel to and circumferentially spaced from the first axial line, said temperature measuring step measuring the temperature of the bearing surface in fifth and sixth spaced positions adjacent the bearing surface on a third axial line parallel to the axis of the bearing and in seventh and eighth spaced positions adjacent the bearing surface on a fourth axial line parallel to and circumferentially spaced from the third axial line, said judging step judging the direction of relative inclination between the shaft and the bearing surface based on the product of the difference in the pressures measured in the first and second position and the difference in the pressures measured in the third and fourth positions and the product of the difference in the temperatures measured in the fifth and sixth positions and the difference in the temperatures measured in the seventh and eighth positions.

8. A method defined in claim 7, wherein the first to the fourth positions are adjacent the fifth to the eighth positions, respectively.

9. A method defined in claim 8, further comprising the step of comparing the measured value of the shaft rotational speed with a reference value to produce a high-speed reference calculating value when the measured value of the shaft rotational speed is greater than the reference value and to produce a low-speed reference calculation value when the measured value of the shaft rotational speed is smaller than the reference value, and the step of correcting the measured values of the oil film pressure based on the high-speed reference calculation value and the low-speed reference calculation value.

10. A system for monitoring the conditions of a journal bearing having a bearing surface supporting a rotatable shaft through an oil film, comprising rotational speed detecting means for detecting the speed of rotation of said shaft to produce a signal indicative of the detected speed of rotation, pressure detecting means for detecting the pressure of the oil film to produce a signal indicative of the detected pressure, a bearing load calculating unit for calculating the load on said journal bearing based on the signals from said rotational speed detecting means and said pressure detecting means, said pressure detecting means detecting the pressure of the oil film in a plurality of positions on said bearing surface to produce signals respectively indicative of the pressures, and a judging unit operative to judge the condition of relative inclination between said shaft and said bearing surface based on the signals from said pressure detecting means to produce a signal indicative of the condition of relative inclination, said bearing load calculating unit calculating the load on said journal bearing based on the signals from said rotational speed detecting means and said judging unit.

11. A system defined in claim 10, further comprising temperature detecting means for detecting the temperature of said bearing surface to produce a signal indicative of the temperature, and wherein said bearing load calculating unit calculates the load on said journal bearing based on the signals from said rotational speed detecting means and said temperature detecting means.

12. A system defined in claim 11, wherein said temperature detecting means is operative to detect the temperature of the bearing surface in a plurality of positions to produce signals respectively indicative of the temperatures, and wherein said judging unit is operative to judge the condition of relative inclination between said shaft and said bearing surface based on the signals from said pressure detecting means and said temperature detecting means.

13. A system defined in claim 12, wherein said judging unit is operative to judge the amount of relative inclination between said shaft and said bearing surface based on the signals from said pressure detecting means and said temperature detecting means to produce a signal indicative of the amount of relative inclination.

14. A system defined in claim 13, wherein said judging unit is further operative to judge the direction of relative inclination between said shaft and said bearing surface based on the signals from said pressure detecting means and said temperature detecting means to produce a signal indicative of the direction of relative inclination.

15. A system defined in claim 14, wherein said judging unit comprises a pressure comparator comparing the signals from said pressure detecting means with predetermined threshold values to produce signals, a temperature comparator comparing the signals from said temperature detecting means with predetermined threshold values to produce signals, and a third comparator comparing the signals from said pressure comparator and said temperature comparator with respective predetermined threshold values to produce signals, and wherein said load calculating unit is operative to calculate the load on said journal bearing based on the signals from said rotational speed detecting means and said third comparator.

16. A system defined in any one of claims 10-15, wherein said pressure detecting means is operative to detect the pressure of the oil film at least in two positions on said bearing surface axially spaced from and aligned with each other.

17. A system defined in any one of claims 11-15, wherein said temperature detecting means is operative to detect the temperature of said bearing surface at least in two positions on said bearing surface axially spaced from and aligned with each other.

18. A system defined in claim 16, wherein said temperature detecting means is operative to detect the temperature of said bearing surface at least in two positions on said bearing surface axially spaced from and aligned with each other.

19. A system defined in claim 15, wherein said pressure detecting means is operative to detect the pressure of the oil film in first and second spaced positions on a first axial line parallel to the axis of said bearing and in third and fourth spaced positions on a second axial line parallel to and circumferentially spaced from said first axial line to produce signals indicative of the oil film pressures, and wherein said temperature detecting means is operative to detect the temperature of said bearing surface in positions respectively adjacent said first to fourth positions on said bearing surface to produce signals indicative of the temperatures of said bearing surface.

20. A system defined in claim 19, wherein said pressure comparator comprises a logic circuit determining a first pressure difference between the pressures detected in said first and second positions and a second pressure difference between the pressures detected in said third and fourth positions, and a logic circuit comparing said first and second pressure differences with respective predetermined threshold values to judge the amount of relative inclination between said shaft and said bearing surface, wherein said temperature comparator comprises a logic circuit determining a first temperature difference between the temperatures detected in said positions adjacent said first and second positions respectively and a second temperature difference between the temperatures detected in said positions adjacent said third and fourth positions respectively and a logic circuit comparing said first and second temperature differences with respective predetermined threshold values to judge the amount of relative inclination between said shaft and said bearing surface, and wherein said third comparator is operative to compare the product of said first and second pressure differences and the product of the first and second temperature differences with respective predetermined threshold values to judge the direction of relative inclination between said shaft and said bearing surface.

21. A system defined in claim 20, wherein said third comparator comprises a logic circuit judging that said shaft and said bearing surface are inclined in a vertical direction relative to each other when the conditions are met that the product of said first and second pressure differences is greater than a first value of said predetermined threshold values and the product of said first and second temperature differences is larger than a second value of said predetermined threshold values, and a logic circuit judging that said shaft and said bearing surface are inclined in a horizontal direction relative to each other when the conditions are met that the product of said first and second pressure differences is smaller than said first predetermined pressure threshold value which is negative and the product of said first and second temperature differences is smaller than said second predetermined temperature threshold value which is negative.

22. A system defined in any one of claims 10-15, further comprising a rotational speed comparator operative to compare the signal from said rotational speed detecting means with a reference value to produce a first signal when the signal from said rotational speed detecting means is greater than the reference value and to produce a second signal when the signal from said rotational speed detecting means is smaller than the reference value, and a corrector operative to correct the signals from said pressure detecting means based on said first and second signals from said rotational speed comparator to produce a signal, and wherein said bearing load calculating unit is operative to calculate the load on said journal bearing based on the signals from said rotational speed detecting means and said corrector.

23. A system defined in claim 22, further comprising a high-speed reference calculating value store responsive to said first signal from said rotational speed detecting means for supplying to said corrector a signal indicative of a bearing load reference calculation value corresponding to said first signal, and a low-speed reference calculation value store responsive to said second signal from said rotational speed detecting means for supplying to said corrector a signal indicative of a bearing load reference calculation value corresponding to said second signal.

24. A system defined in claim 21, further comprising a rotational speed comparator comparing the signal from said rotational speed detecting means with a reference value to produce a first signal when the signal from said rotational speed detecting means is greater than the reference value and to produce a second signal when the signal from said rotational speed detecting means is smaller than the reference value, and a corrector correcting the signal from said third comparator based on said first and second signals from said rotational speed comparator to produce a signal, and wherein said bearing load calculating unit is operative to calculate the load on said journal bearing based on the signals from said rotational speed detecting means and said corrector.

25. A system defined in claim 24, further comprising a high-speed reference calculation value store responsive to said first signal from said rotational speed detecting means for supplying to said corrector a signal indicative of a bearing load reference calculation value corresponding to said first signal, and a low-speed reference calculation value store responsive to said second signal from said rotational speed detecting means for supplying to said corrector a signal indicative of a bearing load reference calculation value corresponding to said second signal.

26. A system defined in claim 25, further comprising an indicating unit for indicating the signals from said pressure comparator, said temperature comparator, said third comparator and said bearing load calculating unit.

* * * * *